United States Patent
Noguchi et al.

(10) Patent No.: US 7,734,598 B2
(45) Date of Patent: Jun. 8, 2010

(54) COMPUTER-READABLE RECORDING MEDIUM HAVING RECORDED HASH-VALUE GENERATION PROGRAM, COMPUTER-READABLE RECORDING MEDIUM HAVING RECORDED STORAGE MANAGEMENT PROGRAM, AND STORAGE SYSTEM

(75) Inventors: Yasuo Noguchi, Kawasaki (JP);
Kazutaka Ogiwara, Kawasaki (JP);
Masahisa Tamura, Kawasaki (JP);
Yoshihiro Tsuchiya, Kawasaki (JP);
Tetsutaro Maruyama, Kawasaki (JP);
Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 11/497,297

(22) Filed: Aug. 2, 2006

(65) Prior Publication Data
US 2007/0239961 A1    Oct. 11, 2007

(30) Foreign Application Priority Data
Mar. 27, 2006    (JP) ............................... 2006-084490

(51) Int. Cl.
*G06F 7/00* (2006.01)
*G06F 17/00* (2006.01)
(52) U.S. Cl. .................. 707/690; 707/698; 713/168
(58) Field of Classification Search ............... 707/102, 707/9, 1, 100; 713/202, 180, 171, 168; 380/30, 380/44, 28; 341/51; 726/19, 13
See application file for complete search history.

(56) References Cited

U.S. PATENT DOCUMENTS

| | | | | |
|---|---|---|---|---|
| 5,754,659 A | * | 5/1998 | Sprunk et al. ................. | 380/30 |
| 5,990,810 A | * | 11/1999 | Williams ....................... | 341/51 |
| 6,061,449 A | * | 5/2000 | Candelore et al. .............. | 380/28 |
| 6,470,329 B1 | * | 10/2002 | Livschitz ........................ | 707/1 |
| 6,560,337 B1 | * | 5/2003 | Peyravian et al. .............. | 380/44 |
| 6,799,273 B1 | * | 9/2004 | Oishi et al. ................... | 713/171 |
| 2002/0184498 A1 | * | 12/2002 | Qi ............................... | 713/168 |
| 2002/0186838 A1 | * | 12/2002 | Brandys ....................... | 380/30 |
| 2005/0091545 A1 | * | 4/2005 | Soppera ....................... | 713/202 |
| 2005/0108240 A1 | * | 5/2005 | Bolosky et al. ................ | 707/9 |
| 2005/0210260 A1 | * | 9/2005 | Venkatesan et al. .......... | 713/180 |

(Continued)

OTHER PUBLICATIONS

Patent Abstracts of Japan, Japanese publication No. 2000-347911, published Dec. 15, 2000.
Patent Abstracts of Japan, Japanese publication No. 2001-043237, published Feb. 16, 2001.

(Continued)

*Primary Examiner*—Jean M Corrielus
*Assistant Examiner*—Giovanna Colan
(74) *Attorney, Agent, or Firm*—Fujitsu Patent Center

(57) ABSTRACT

A computer-readable recording medium having recorded a hash-value generation program for calculating a hash value within a shorter period of processing time. When a target disk is specified for hash value calculation, a segment division block divides the target disk into fixed-length segments. A first hash-value calculation block applies a one-way hash function to all data in each segment to calculate a per-segment hash value. A second hash-value calculation block arranges the per-segment hash values in a segment order corresponding to the order of the data stored on the target disk and applies the one-way hash function again to the arranged per-segment hash values to calculate a total hash value. The hash value calculated in this manner is defined as a hash value of the target disk.

12 Claims, 9 Drawing Sheets

U.S. PATENT DOCUMENTS

2006/0282457 A1* 12/2006 Williams .................... 707/102
2007/0011734 A1* 1/2007 Balakrishnan et al. ........ 726/13
2007/0067332 A1* 3/2007 Gallagher et al. ........... 707/102
2007/0083531 A1* 4/2007 Hussain ..................... 707/100

OTHER PUBLICATIONS

Patent Abstracts of Japan, Japanese publication No. 2002-358011, published Dec. 13, 2002.
R. Take, "Organic Storage System" Fujitsu. 55, 4, published Jul. 2004, pp. 364-367.

* cited by examiner

COMPUTER-READABLE RECORDING MEDIUM HAVING RECORDED HASH-VALUE GENERATION PROGRAM, COMPUTER-READABLE RECORDING MEDIUM HAVING RECORDED STORAGE MANAGEMENT PROGRAM, AND STORAGE SYSTEM

CROSS-REFERENCE TO RELATED APPLICATIONS

This application is based upon and claims the benefits of priority from the prior Japanese Patent Application No. 2006-084490, filed on Mar. 27, 2006, the entire contents of which are incorporated herein by reference.

BACKGROUND OF THE INVENTION

1. Field of the Invention

The present invention relates to computer-readable recording media having recorded hash-value generation programs, computer-readable recording media having recorded storage management programs, and storage systems. In particular, the present invention relates to a computer-readable recording medium having recorded a hash-value generation program for generating a hash value of data stored on a target disk by using a predetermined one-way hash function; and a computer-readable recording medium having recorded a storage management program and a storage system, for storing data on a virtual logical disk in a storage and managing the data using such a hash value.

2. Description of the Related Art

Storage systems have been used not only to store a large amount of data generated in various environments, such as documents in compliance with the e-document law, email archives, video data, research and development experimental data, and clinical charts, but also to process and manage the large amount of data. With a recent expanding range of applications and increasing amount of information accompanied by a larger storage capacity, there is a growing need for stable service provision and ensured reliability and security.

FIG. 9 is an outline diagram depicting one example structure of a known storage system.

The example storage system shown in the figure includes a module 1 (920), a module 2 (930), and a module 3 (940), each of which stores data in a storage thereof through independent input and output processing. The modules 1 (920), 2 (930), and 3 (940) are interconnected via a network 910. In the storage system with this structure, in practice, data stored in a distribution manner in the module 1 (920), the module 2 (930), and the module 3 (930) is provided to a user in the form of a virtual logical disk 900. In the example in the figure, the logical disk 900, provided for the user, is divided into five segments S1, S2, S3, S4, and S5, which correspond to an area S1 (921) and an area S5 (922) of the module 1 (920), an area S2 (931) and an area S4 (932) of the module 2 (930), and an area S3 (941) of the module 3 (940).

For an environment where such processing apparatuses including processors and external storage devices are arranged hierarchically on a network, there is proposed a system that allows a database table to be divided and managed by a user-specified method to achieve uniform data distribution and data search according to a division system, for efficient input and output processing of data (see, for example, paragraph numbers [0029] to [0039] and FIGS. 5 to 9 of Japanese Unexamined Patent Application Publication No. 2000-347911).

In addition, there is also proposed a system in which a database table is divided into blocks using the index of a particular field to build a table in each block as a transposed file (see, for example, paragraph numbers [0027] to [0028] and FIG. 9 of Japanese Unexamined Patent Application Publication No. 2001-43237).

Some information stored in a storage system, such as documents in compliance with the e-document law which need to be stored for a certain period of time, is controlled so as to be readable but uneditable (hereinafter, this feature is called a read only feature). It is not necessary to prove non-tampering for media which physically prevent data from being written, such as Compact Disc Read Only Memories (CD-ROMs) and Digital Versatile Disc Read Only Memories (DVD-ROMs). However, storage systems are typically realized by hard disk units (Hard Disk Drives), which cannot physically prevent data from being written but can disable data from being written by the systems. For this reason, it is necessary to prove non-tampering.

To prove non-tampering, when data is to be stored, an arithmetic operation is carried out for all data (X) on the logical disk 900 using a hash function H to calculate a hash value H[X]. The calculated hash value H[X] is saved in a storage device. The hash value and the hash function may be publicized. Thereafter, for example, at an audit or when the data is used, an arithmetic operation is carried out for all data (X') on the logical disk 900 at that time using a one-way hash function (H) to calculate a hash value H(X'). The hash value H(X'), obtained in this manner, is compared with the hash value H[X], calculated before storage. If H[X]=H(X'), then X=X' (non-tampering) can be proved. This processing may be carried out by another apparatus, such as a server that uses the data, using the publicized hash value and hash function.

With a recent increasing size of data in storage systems, techniques for efficient input and output processing of data have been proposed, as described in Japanese Unexamined Patent Application Publication No. 2000-347911 (paragraph numbers [0029] to [0039] and FIGS. 5 to 9) and Japanese Unexamined Patent Application Publication No. 2001-43237 (paragraph numbers [0027] to [0028] and FIG. 9). In these techniques, hash values are calculated with respect to all data on the logical disk 900 at once. Therefore, the larger the size of the data, the longer the processing time for calculating a hash value, causing an operation problem.

This applies not only to the logical disk 900, containing data distributed in a plurality of storages, but also to a single storage containing all data therein. Depending on the data size, a long time required for hash value generation may cause an operation problem.

SUMMARY OF THE INVENTION

In view of the foregoing, it is an object of the present invention to provide a computer-readable recording medium having recorded a hash-value generation program, a computer-readable recording medium having recorded a storage management program, and a storage system, all for calculating a hash value within a shorter period of processing time.

To accomplish the above object, according to the present invention, there is provided a computer-readable recording medium having recorded a hash-value generation program for generating a hash value of data stored on a target disk by the use of a predetermined one-way hash function. With this computer-readable recording medium, the hash-value generation program causes a computer to function as a segment division block for dividing the target disk into fixed-length segments; a first hash-value calculation block for applying the one-way hash function to all data in the segments generated by the segment division block to calculate per-segment hash values; and a second hash-value calculation block for arranging the per-segment hash values calculated by the first hash-value calculation block, in a segment order corresponding to the order of the data stored on the target disk and for applying the one-way hash function to the per-segment hash values to calculate a total hash value.

To accomplish the above object, according to the present invention, there is provided a computer-readable recording medium having recorded a storage management program for managing a storage system in which data on a virtual logical disk is stored in units of segments in a distribution manner in a plurality of storage modules. With this computer-readable recording medium, the storage management program causes a computer to function as a control block for controlling a first hash-value calculation block included in each of the plurality of storage modules to apply a one-way hash function to all data in a corresponding segment to calculate a per-segment hash value, the segments having a fixed length; and a second hash-value calculation block for acquiring the per-segment hash values calculated by the first hash-value calculation block of the storage modules, for arranging the per-segment hash values in a segment order corresponding to the order of the data on the logical disk, and for applying the one-way hash function to calculate a total hash value of the logical disk.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will now be described with reference to the drawings. First, the concept of the invention to be applied to the embodiment will be described, followed by a detailed description of the embodiment itself.

Figure 1:
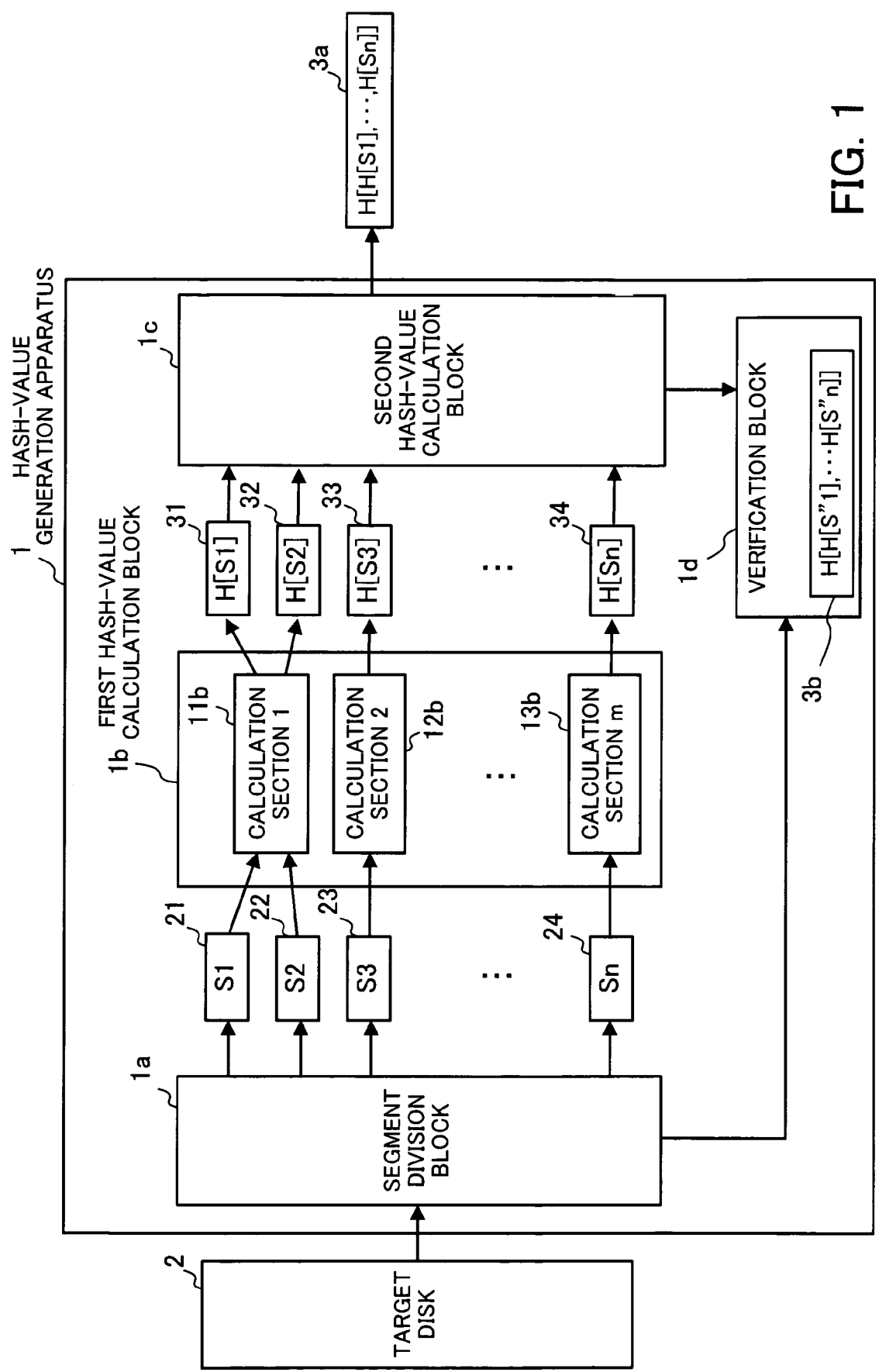
FIG. 1 is an outline diagram depicting the invention applied to an embodiment.

FIG. 1 is an outline diagram depicting the invention applied to the embodiment.

A hash-value generation apparatus 1 according to the present invention includes a segment division block 1a for dividing a target disk 2 into segments; a first hash-value calculation block 1b for calculating a per-segment hash value; a second hash-value calculation block 1c for calculating a total hash value; and a verification block 1d for performing verification using hash values. A hash value 3a with respect to data stored on the target disk 2 is generated based on a one-way hash function (hereinafter, a one-way hash function is referred to just as a hash function). The above-described processing blocks are realized by a computer executing a hash-value generation program.

A one-way hash function H[X] is defined as a function that satisfies the following conditions:

1. It is difficult to find y (x≠y) that satisfies H[x]=H[y] for a certain value x,
2. It is difficult to find a pair of x and y (x≠w y) that satisfy H[x]=H[y], and
3. It is very difficult to calculate back x from H[x].

Some functions are known as one-way hash functions. In the present invention, any of such one-way functions is selected according to the applied system.

The segment division block 1a divides the target disk 2 into n (n is any integer) segments with a fixed length and reports them to the first hash-value calculation block 1b. The target disk 2 is a storage device having a memory area set for storing data from which a hash value is to be calculated, and is realized by a physical memory or a virtual memory generated with a virtual memory mechanism.

The first hash-value calculation block 1b includes a calculation section 1 (11b), a calculation section 2 (12b), ..., and a calculation section m (13b) that are concurrently operable, where m is any integer and may be different from the number of segments n. The calculation sections 1 to m (11b to 13b) carry out calculation for data strings in respective specified segments using the common hash function H[X] to generate per-segment hash values H[S]. Which calculation section is in charge of the data string in which segment is determined by a control section (not shown in the figure). Each calculation section is informed of, for example, a segment or the start address of a segment and the data size. A calculation section that has received an instruction for calculating a hash value for a certain segment reads the data string in the segment and calculates a per-segment hash value. In the example in the figure, the calculation section 1 (11b) is instructed to calculate for a segment S1 (21) and generates an H[S1] 31. Next, the calculation section 1 (11b) is instructed to calculate for a segment S2 (22) and generates an H[S2] 32. Instructions may be given all at once. In that case, the calculation section 1 (11b) carries out the processing successively by interpreting the instructions. Similarly, the calculation section 2 (12b) is instructed to calculate for a segment S3 (23) and generates an H[S3] 33. The calculation section m (13b) is instructed to calculate for a segment Sn (24) and generates an H[Sn] 34. The control section is provided for any component of the hash-value generation apparatus 1, such as the segment division block 1a or the first hash-value calculation block 1b. The generated per-segment hash values H[S1] 31, H[S2] 32, H[S3] 33, ..., and H[Sn] 34 are output to the second hash-value calculation block 1c.

The second hash-value calculation block 1c arranges the per-segment hash values H[S] calculated by the first hash-value calculation block 1b in accordance with the order of the data stored on the target disk 2. In the example in the figure, the per-segment hash values are arranged in order of H[S1]

31, H[S2] 32, H[S3] 33, . . . , and H[Sn] 34. The hash function is applied again to the per-segment hash values H[S] that have been arranged in this manner to calculate a total hash value. In the example in the figure, the total hash value H[H[S1], . . . , H[Sn]] 3a is obtained from the per-segment hash values H[S1] 31, H[S2] 32, H[S3] 33, . . . , and H[Sn] 34.

The total hash value (assumed to be HH[X]) obtained through the above-described two-stage hash computation using the first hash-value calculation block 1b and the second hash-value calculation block 1c still holds unidirectionality, although it differs from a hash value (assumed to be H[X]) obtained by applying the hash function to the data strings on the entire target disk 2 as was done conventionally. Furthermore, the hash value HH[X] obtained through the above-described two-stage hash computation with a fixed segment size always exhibits the same value, as long as the data is not tampered with. Therefore, HH[X] can be handled in the same way as H[X], provided that the segment size is fixed. For this reason, when HH[X'] calculated at an audit is verified with HH[X] calculated at the time of data registration, if HH[X]= HH[X'], then X=X', namely, non-tampering can be proved.

The verification block 1d saves the total hash value calculated by the first hash-value calculation block 1b and the second hash-value calculation block 1c in a storage block at a predetermined timing, for example, when data is registered on the target disk 2 or writing to the target disk 2 is disabled. This saved hash value is assumed to be H[H[S"1], . . . , H[S"n]] 3b. At this time, if necessary, the segment size and the hash function used for calculation are also saved in the storage block. Thereafter, at any later point of time, for example, when verification is required because an audit is requested, the total hash value 3a of the target disk 2 is calculated using the segment division block 1a, the first hash-value calculation block 1b, and the second hash-value calculation block 1c. This calculation is carried out with reference to the stored hash function and segment size, if necessary. Then, the obtained total hash value 3a is verified with the total hash value 3b stored in the storage block to determine whether they match. When they match, it is determined that the target disk 2 has the same contents as when the total hash value 3b was registered, namely, that the target disk 2 has not been tampered with since the total hash value 3b was registered. If the two hash values 3a and 3b do not match, it indicates that the target disk 2 has been tampered with.

The operation of the hash-value generation apparatus 1 with the above-described structure will now be described.

When the target disk 2 is specified for the hash-value generation apparatus 1, the segment division block 1a divides the target disk 2 into fixed-length segments. In the first hash-value calculation block 1b, the calculation section 1 (11b), the calculation section 2 (12b), . . . , and the calculation section m (13b), which operate in parallel, read out the data strings S1 (21), S2 (22), S3 (23), . . . , and Sn (24) in the respectively assigned segments and apply the hash function H[X] to calculate the per-segment hash values H[S1] 31, H[S2] 32, H[S3] 33, . . . , and H[Sn] 34. Then, the second hash-value calculation block 1c applies the hash function again to the per-segment hash values H[S1] 31, H[S2] 32, H[S3] 33, . . . , and H[Sn] 34 calculated by the first hash-value calculation block 1b to calculate the total hash value H[H[S1], . . . , H[Sn]] 3a. The verification block 1d stores in the storage block the calculated total hash value H[H[S1], . . . , H[Sn]] 3a at a predetermined timing. This is referred to as the total hash value (saved data) H[H[S"1], . . . , H[S"n]] 3b. In addition, the applied hash function and the segment size of the generated segments are also saved, as required. Then, when verification of the target disk 2 is required at any later point of time, the total hash value 3a of the target disk 2 which is calculated with the same segment size and the hash function is verified with the saved total hash value 3b to determine whether they match. When they match, it is determined that the target disk 2 has the same contents as when the total hash value 3b was saved. If the two hash values 3a and 3b do not match, it indicates that the target disk 2 has been tampered with.

As described above, since a plurality of calculation sections in the first hash-value calculation block 1b carry out segment-by-segment calculation concurrently, this processing can be performed faster than in a case where hash calculation is carried out for the data strings on the entire target disk 2.

Furthermore, a hash value of the target disk 2 is calculated and saved at a predetermined timing, and when verification is required at any later point of time, a hash value at that point of time is calculated and is verified with the saved hash value to determine whether the target disk 2 has not been tampered with.

In the above description, the per-segment hash values are calculated in parallel using the plurality of concurrently operable calculation sections in the first hash-value calculation block 1b. Alternatively, the same HH[X] can also be obtained by calculating hash values for segments one at a time with a single processor. Therefore, the HH[X] can be calculated and used even in an apparatus not including a plurality of concurrently operable calculation sections, such as a host computer that utilizes the data.

In a storage system in which data on a virtual logical disk provided for a user is stored in a distribution manner in a plurality of modules, the logical disk is already divided into segments which are assigned to the modules. For this reason, when the present invention is applied to such a storage system, the segment division block 1a can be omitted, provided that the segment size is set to a fixed length. In addition, the present invention can be easily applied by providing each of the calculation sections constituting the first hash-value calculation block 1b in a respective module. The embodiment will be described in detail with reference to the drawings by way of an example where the embodiment is applied to a storage system in which data on a logical disk is stored in a distribution manner in a plurality of modules.

Figure 2:
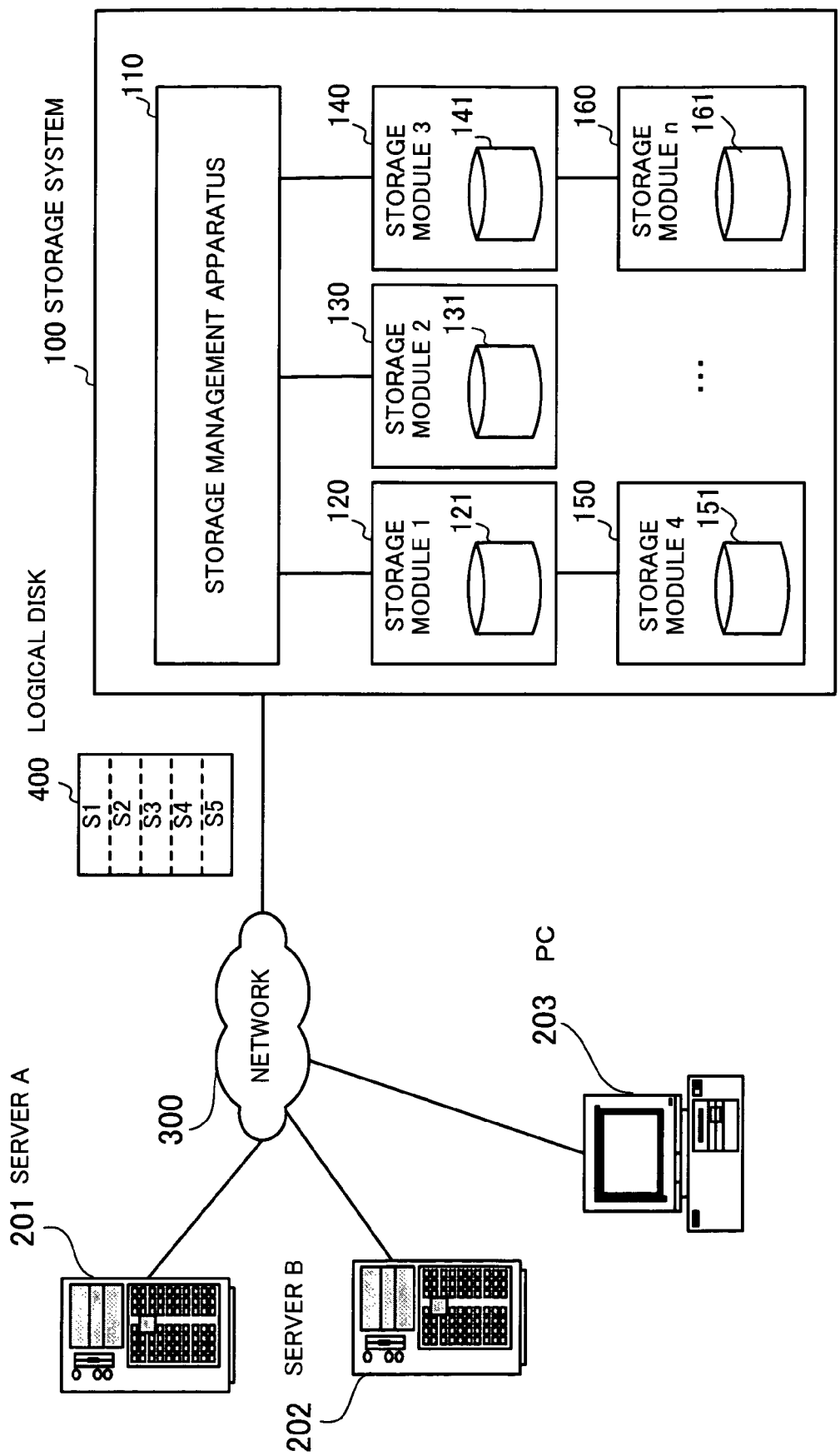
FIG. 2 is a block diagram depicting the structure of a storage system according to an embodiment of the present invention.

FIG. 2 is a block diagram depicting the structure of a storage system according to the embodiment of the present invention.

A storage system 100 according to the embodiment of the present invention stores and manages various types of data and provides various services such as to supply data in response to a request sent from, for example, a server A (201), a server B (202), and a personal computer (PC) 203 which are interconnected via a network 300. The storage system 100 has a logical disk 400 available to each of the server A (201), the server B (202), and the PC 203. The server A (201), the server B (202), and the PC 203 issue an access request to this logical disk 400. The logical disk 400 is a virtual memory area where a memory space to be provided for a user is generated with a virtual memory mechanism.

The storage system 100 includes a storage management apparatus 110 for performing comprehensive management, and independently operable storage modules 1 (120), 2 (130), 3 (140), 4 (150), . . . , and n (160).

The storage modules 1 (120), 2 (130), 3 (140), 4 (150), . . . , and n (160) include storage devices 121, 131, 141, 151, . . . , and 161, respectively, and processors. Hereinafter, the storage modules 1 (120), 2 (130), 3 (140), 4 (150), . . . , and n (160) are referred to just as "storage modules," and the storage devices 121, 131, 141, 151, . . . , and 161 are referred to just as "storage devices," unless it is necessary to specify particular ones. Each storage module stores data on the logical disk 400 in units of segments with a fixed length and performs data input and output processing under the control of the storage management apparatus 110 or autonomously. The storage modules are connected to the storage management apparatus 110 via a predetermined network (not shown in the figure) to carry out calculation of per-segment hash values at a timing requested by the storage management apparatus 110. In the example in the figure, the logical disk 400 is divided into five segments S1 to S5, each of which is stored in the storage device of a selected storage module of the storage modules.

The storage management apparatus 110 manages the storage modules. More specifically, the storage management apparatus 110 performs utilization management of data stored in each storage module, and periodic audits and failure monitoring. Details of this processing will be described later.

Figure 3:
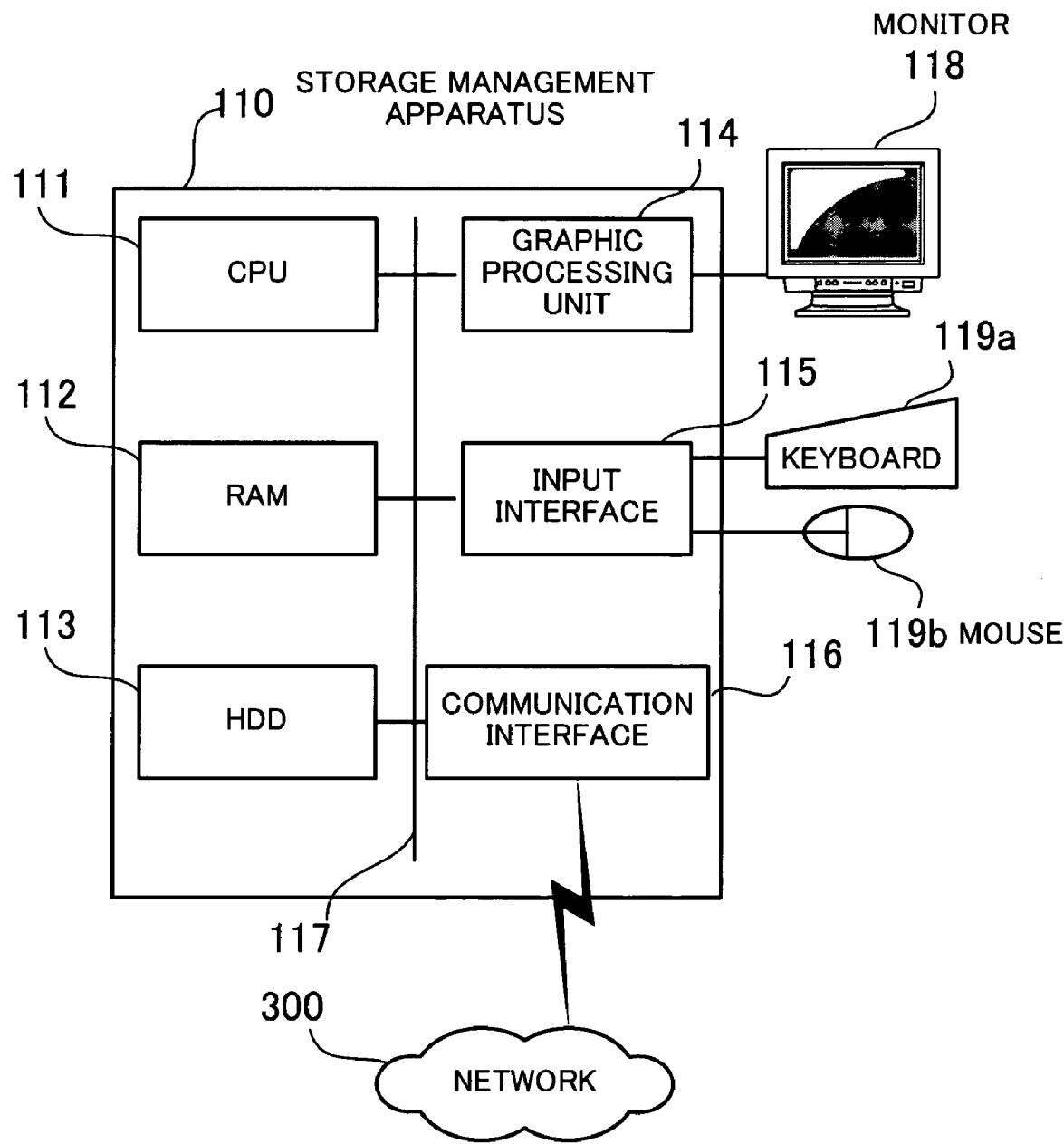
FIG. 3 is a block diagram depicting an example hardware configuration of a storage management apparatus according to the present embodiment.

Next, the hardware configuration of the storage management apparatus 110 is described. FIG. 3 is a block diagram depicting an example hardware configuration of the storage management apparatus 110 according to the present embodiment.

The storage management apparatus 110 is comprehensively controlled by a central processing unit (CPU) 111. A random access memory (RAM) 112, a hard disk drive (HDD) 113, a graphic processing unit 114, an input interface 115, and a communication interface 116 are connected to the CPU 111 via a bus 117.

The RAM 112 temporarily stores at least part of an operating-system (OS) program and an application program to be executed by the CPU 111. The RAM 112 also stores various types of data necessary for processing by the CPU 111. The HDD 113 stores, for example, the OS and application programs. A monitor 118 is connected to the graphic processing unit 114 so that images are displayed on the screen of the monitor 118 according to commands from the CPU 111. A keyboard 119*a* and a mouse 119*b* are connected to the input interface 115 so that signals sent from the keyboard 119*a* and the mouse 119*b* are transmitted to the CPU 111 via the bus 117. The communication interface 116 is connected to the network 300 so that data is transmitted and received to and from the server A (201), the B (202), and the PC 203 via the network 300.

With this hardware configuration, the processing function according to this embodiment can be achieved. In FIG. 3, the monitor 118, the keyboard 119*a*, and the mouse 119*b* are connected directly to the storage management apparatus 110. Alternatively, the storage management apparatus 110 may be connected to a communication terminal provided with the monitor 118, the keyboard 119*a*, and the mouse 119*b*, via the network 300. In this case, an input instruction, for example, from the mouse 119*b* or the keyboard 119*a* of the communication terminal is acquired via the network 300 to perform the processing, and the processing result output via the network 300 is displayed on the monitor 118 of the communication terminal.

Next, the software configuration of the storage system 100 will be described.

Figure 4:
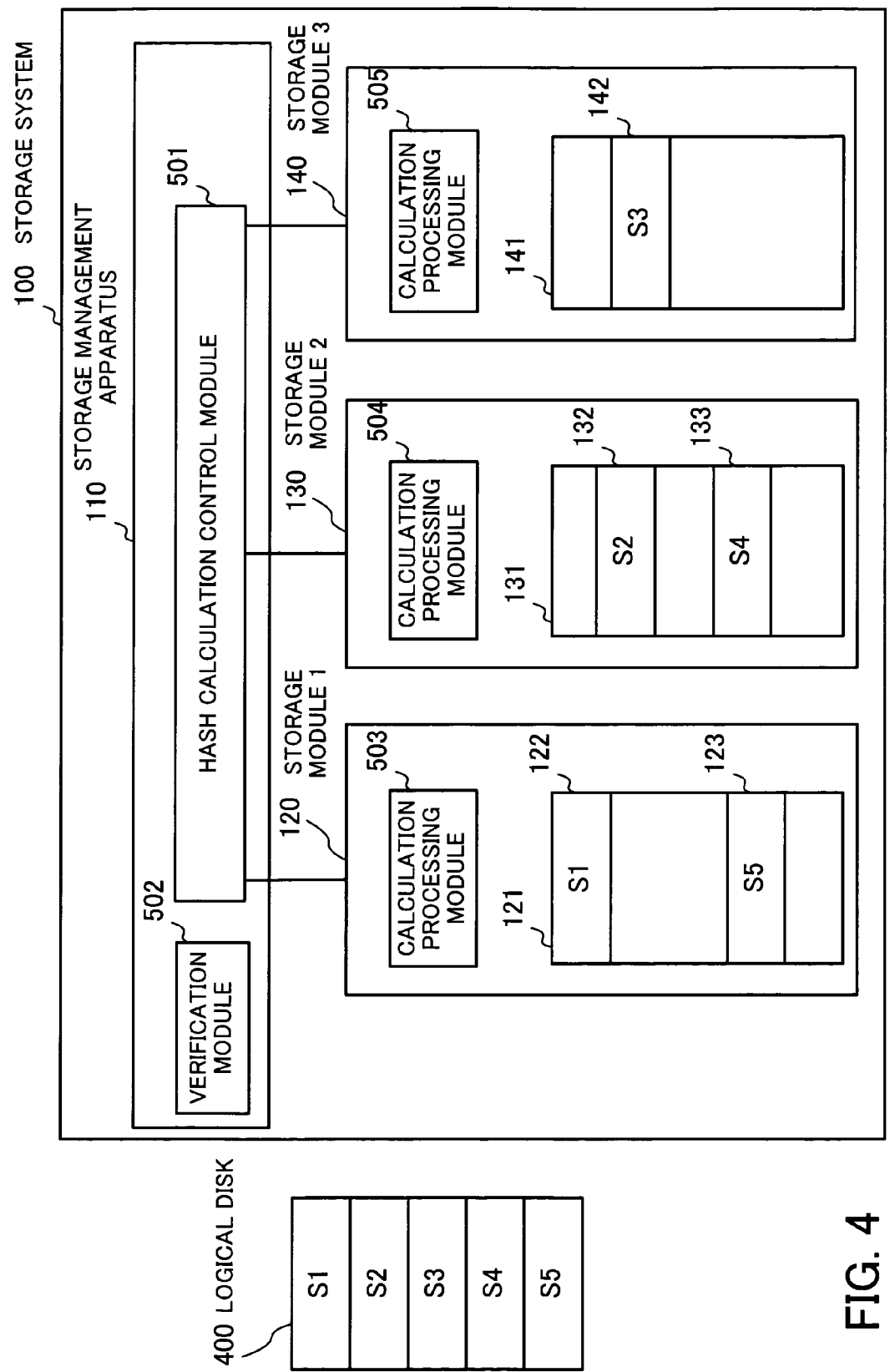
FIG. 4 is a diagram depicting an example software configuration of the storage system according to the present embodiment.

FIG. 4 is a diagram depicting an example software configuration of the storage system 100 according to the present embodiment.

In FIG. 4, only modules related to hash calculation processing are shown, and an input and output processing module for carrying out input and output processing of data stored in a distribution manner in the storage modules is omitted. Data input and output processing may be carried out, for example, such that reading of data from and writing of data to each module is controlled by the storage management apparatus 110 and each module carries out input and output processing according to instructions from the storage management apparatus 110. Alternatively, each storage module may autonomously carry out input and output processing.

The modules related to hash value calculation processing will now be described.

In the storage system 100, the storage management apparatus 110 has a hash calculation control module 501 and a verification module 502; the storage module 1 (120) has a calculation processing module 503 and the storage 121; the storage module 2 (130) has a calculation processing module 504 and the storage 131; and the storage module 3 (140) has a calculation processing module 505 and the storage 141.

The hash calculation control module 501 controls hash value calculation and performs processing as the second hash-value calculation block for performing hash value calculation for the entire logical disk 400. More specifically, when hash calculation is started, the hash calculation control module 501 refers to meta-information of the logical disk 400, and instructs the storage module 1 (120), the storage module 2 (130), and the storage module 3 (140) to calculate a hash value for each segment stored therein. Then, the hash calculation control module 501 receives the per-segment hash values calculated by the storage module 1 (120), the storage module 2 (130), and the storage module 3 (140) according to the instructions and arranges them in a segment order corresponding to the order of the data stored on the logical disk 400. Thereafter, the hash calculation control module 501 applies the hash function again to calculate a total hash value of the logical disk 400.

The verification module 502 carries out processing as the verification block. More specifically, at a predetermined timing, such as when writing of data onto the logical disk 400 is disabled, the verification module 502 issues an instruction for performing hash calculation to the hash calculation control module 501. Then, the verification module 502 stores the hash value of the logical disk 400 acquired from the hash calculation control module 501 together with the segment size and the hash function. These values may be publicized so that other apparatuses such as the server A (201), the server B (202), and the PC (203) can use them. Thereafter, upon request for an audit or at a predetermined monitoring timing, the verification module 502 instructs the hash calculation control module 501 to calculate a hash value of the logical disk 400. If necessary, the verification module 502 sends the segment size and the hash function. When the verification module 502 acquires the re-calculated hash value of the logical disk 400 from the hash calculation control module 501, the verification module 502 compares the acquired current hash value with the saved hash value to check whether they match to determine whether tampering has not been made.

In the storage module 1 (120), the storage 121 has an area S1 (122) for storing the segment S1 and an area S5 (123) for storing the segment S5 of the logical disk 400. Furthermore, the calculation processing module 503 applies the hash function to the data string in each of the segments S1 and S5 to calculate a per-segment hash value according to the instruction from the hash calculation control module 501. The calculated per-segment hash values are output to the hash calculation control module 501.

In the storage module 2 (130), the storage 131 has an area S2 (132) for storing the segment S2 and an area S4 (133) for storing the segment S4 of the logical disk 400. Furthermore, as the calculation processing module 503, the calculation processing module 504 calculates per-segment hash values for the segment S2 and the segment S4 and outputs them to the hash calculation control module 501.

In the storage module 3 (140), the storage 141 has an area S3 (142) for storing the segment S3 of the logical disk 400. Furthermore, as the calculation processing module 503, the calculation processing module 505 calculates a per-segment hash value for the segment S3 and outputs it to the hash calculation control module 501.

Although only the three storage modules have been described above, any number of storage modules can be used. In addition, the logical disk 400 is one of a plurality of logical disks provided for each user. Each logical disk is differentiated from others by, for example, a logical disk ID.

The operation of the storage system 100 with the above-described structure will be described.

For example, when data is written to the logical disk 400, the hash calculation control module 501 starts calculation processing according to an instruction from the verification module 502. The hash calculation control module 501 refers to the meta-information of the logical disk 400 and issues an instruction for calculating hash values for the segment S1 and the segment S5 to the storage module 1 (120). Instructions may be given all at once or one after another each time one calculation operation is completed. Without waiting for a response from the storage module 1 (120), the hash calculation control module 501 issues an instruction for calculating hash values for the segment S2 and the segment S4 to the storage module 2 (130) and then issues an instruction for calculating a hash value for the segment S3 to the storage module 3 (140). Each storage module follows the instruction to calculate a per-segment hash value(s) and responds by outputting the calculated per-segment hash value(s) to the hash calculation control module 501. When the hash calculation control module 501 receives the hash values for the segment S1 and the segment S5 from the storage module 1 (120), the hash values for the segment S2 and the segment S4 from the storage module 2 (130), and the hash value for the segment S3 from the storage module 3 (140), it arranges them in segment order of the logical disk 400, applies again the hash function to the arranged per-segment hash values to calculate a total hash value, and outputs it to the verification module 502 as a hash value of the logical disk 400. The verification module 502 associates the hash value of the logical disk 400, the hash function, and the segment size with the logical disk 400 and saves or publicizes them. The term "publicize" means to permit these values to be referred to from other apparatuses connected via a network. More specifically, requests made by other apparatuses are responded to by transmitting the saved data, or the data is saved in a storage device accessible by the other apparatuses. When these pieces of data are not publicized, the segment size or the hash function does not need to be saved unless necessary.

At an audit, the verification module 502 instructs the hash calculation control module 501 to calculate a hash value of the logical disk 400. The instruction may be issued at predetermined intervals or may be issued when an instruction is received from an external apparatus connected via the network 300. Alternatively, an event that generates an instruction can be specified in a desired manner. The hash calculation control module 501 follows the same procedure as described above to calculate the current hash value of the logical disk 400 and outputs it to the verification module 502. The verification module 502 compares the acquired hash value of the logical disk 400 with the saved hash value of the logical disk 400. When they match, non-tampering is proved. If they do not match, it is determined that tampering has been made.

As described above, according to this embodiment, since the storage modules carry out hash calculation concurrently, the time required for the calculation processing can be reduced. Particularly in storage systems, like the one according to the embodiment, where data on the logical disk is stored in units of segments in distribution manner in a plurality of storage modules, an increase in the amount of storage data is handled by increasing the number of storage modules. Therefore, regardless of an increase in system capacity, an increase in time for hash value calculation processing can be avoided by carrying out the hash calculation on a module-by-module basis, as with this embodiment. As a result, an increased number of hash calculation operations due to an increase in capacity, which is a conventional operation problem, can be suppressed, and therefore an increase in system capacity can be achieved without increasing the processing time.

The verification module 502 determines whether data has been tampered with in the above description. An audit can also be conducted directly by a system administrator. In this case, the hash calculation control module 501 of the storage management apparatus 110 is started up directly using, for example, a terminal device of the system administrator to obtain a hash value of the logical disk 400. The obtained hash value of the logical disk 400 is stored and managed by the system administrator together with the hash function and the segment size. These items of data may be publicized. At an audit later on, the same procedure is followed to startup the hash calculation control module 501 and obtain a hash value of the logical disk 400. Then, the obtained hash value is compared with the stored hash value of the logical disk 400 to determine whether tampering has not been made.

The operation of the storage system 100 according to this embodiment in a case where the above-described procedure is carried out will be described.

Figure 5:
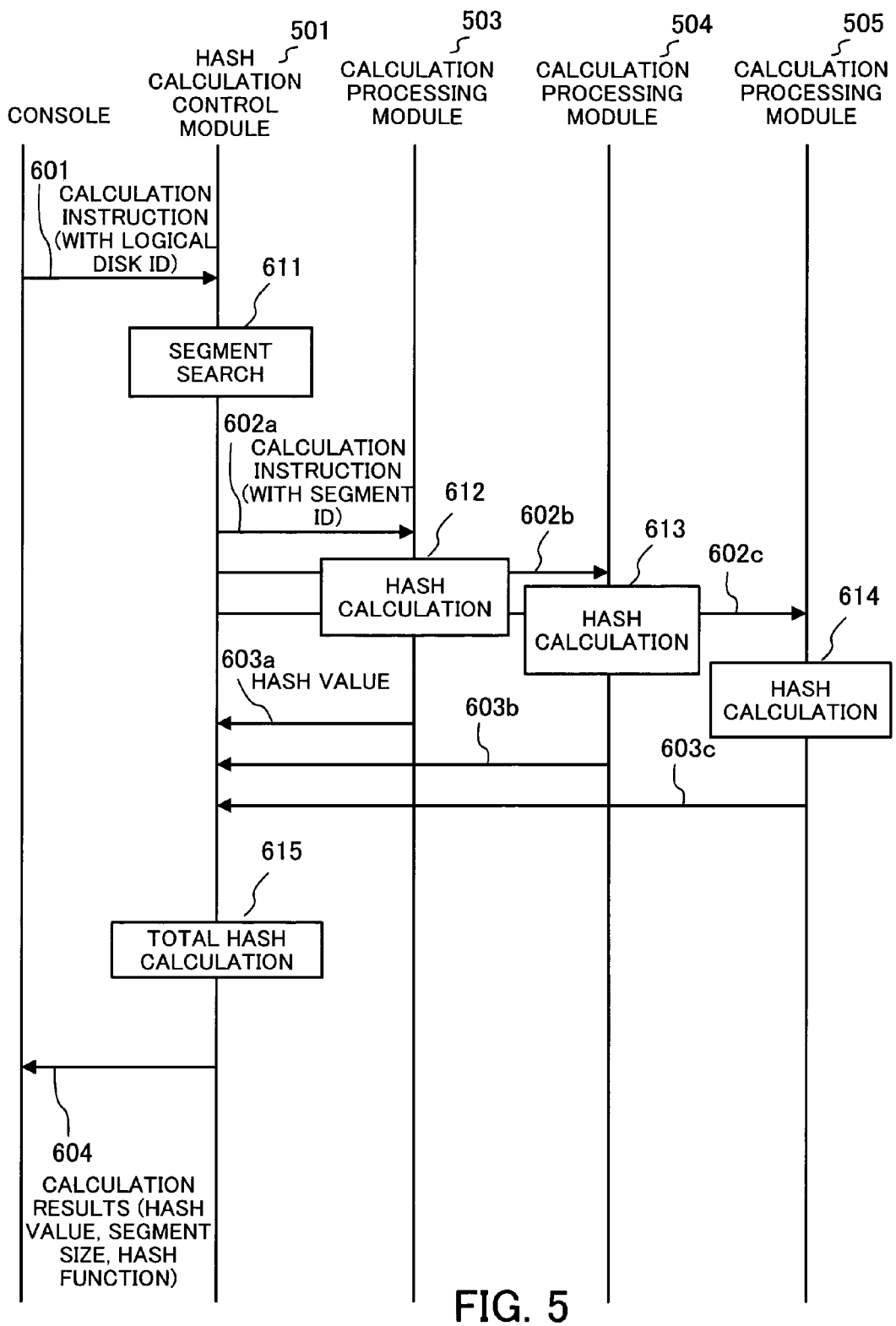
FIG. 5 is a flowchart illustrating the operation of the storage system according to the present embodiment.

FIG. 5 is a flowchart illustrating the operation of the storage system 100 according to the present embodiment. The same components in FIG. 5 as those in FIG. 4 are denoted with the same reference numerals. Furthermore, it is assumed that the time elapses from top to bottom in the figure.

When an administrator or a user enters an instruction using a console (operation input device with which the administrator or the user enters an instruction), a logical disk ID for identifying the logical disk for which hash calculation is to be carried out and a calculation instruction 601 are input from the console to the hash calculation control module 501 of the storage management apparatus 110.

When the hash calculation control module 501 receives the calculation instruction 601, it refers to the meta-information of the logical disk ID to carry out a segment search 611. Then, the hash calculation control module 501 sends a calculation instruction(s) to the calculation processing module(s) of the storage module(s) that stores the found segment(s), together with the segment ID(s). In the example in the figure, a calculation instruction 602*a* to the calculation processing module 503 of the storage module 1 (120), a calculation instruction 602*b* to the calculation processing module 504 of the storage module 2 (130), and a calculation instruction 602*c* to the calculation processing module 505 of the storage module 3 (140) are output in succession.

The calculation processing module 503 of the storage module 1 (120) carries out hash calculation 612 for a data string in the segment stored therein in response to the calculation instruction 602*a* and sends a calculated hash value 603*a* to the hash calculation control module 501. Similarly, the calculation processing module 504 of the storage module 2 (130) carries out hash calculation 613 in response to the calculation instruction 602b and sends a calculated hash value 603b to the hash calculation control module 501. The calculation processing module 505 of the storage module 3 (140) carries out hash calculation 614 in response to the calculation instruction 602c and sends a calculated hash value 603c to the hash calculation control module 501. In this manner, hash calculation is concurrently carried out by each storage module.

When the hash calculation control module 501 receives the hash values 603a, 603b, and 603c, it carries out total hash calculation 615 by using the same hash function and outputs calculation results (hash value) and segment size and hash function 604 to the console.

The console saves the acquired total hash value, which is used at any later point of time in subsequent processing. If another total hash value has already been saved, the acquired hash value is verified with the saved hash value to determine whether tampering has not been made. Alternatively, it may be verified with the publicized hash value.

FIG. 5 is a flowchart applied in a case where an instruction is issued from the console. In a case where an audit is made by the verification module 502 in the apparatus, an instruction is issued from the verification module 502 instead of the console. The operations of the hash calculation control module 501, the calculation processing module 503, the calculation processing module 504, and the calculation processing module 505 are the same.

As described above, the hash calculation control module 501 instructs subordinate storage modules to carry out hash value calculation processing on a segment-by-segment basis in response to an instruction from the verification module 502 or from an external apparatus. When the calculation processing module of each storage module carries out hash value calculation by itself according to the instruction, parallel hash calculations are realized to achieve fast processing.

Next, processing procedures carried out by the hash calculation control module 501 and the calculation processing module of each storage module (hereinafter, referred to just as a module) will be described.

Figure 6:
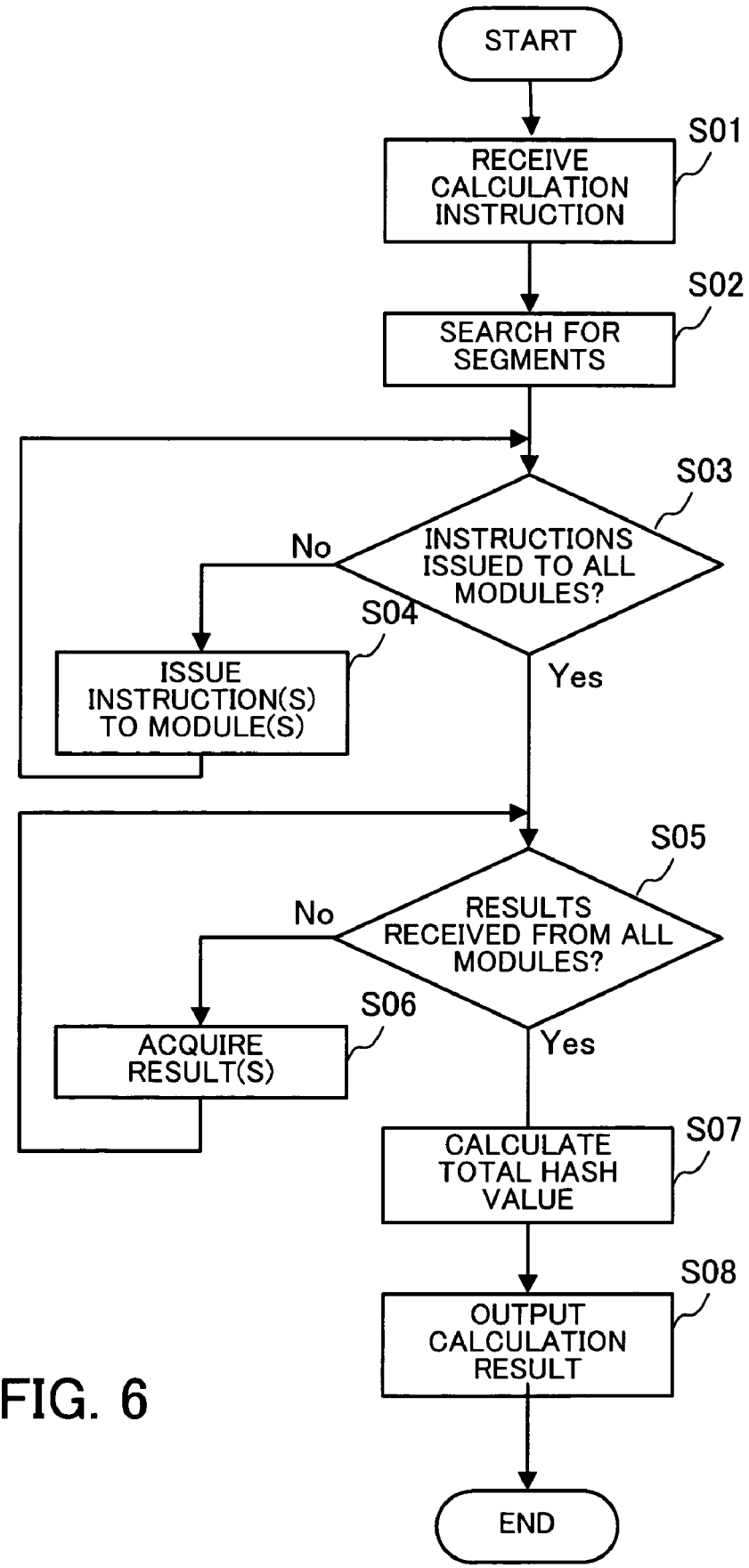
FIG. 6 is a flowchart illustrating a procedure for hash calculation control processing according to the present embodiment.

First, a processing procedure by the hash calculation control module 501 will be described. FIG. 6 is a flowchart illustrating a procedure for hash calculation control processing according to the present embodiment.

Step S01: When a calculation instruction with a target logical disk specified is input, for example, from the console, the processing is started and the flow proceeds to the next step.

Step S02: The meta-information of the specified logical disk is read out, and a search is made for segments of the target logical disk by referring to the meta-information to determine modules that store the data in the segments. Then, a list of information about all target modules is acquired.

Step S03: It is determined whether instructions have been issued to all the modules based on the list of information about all the modules acquired in step S02. When instructions have not been issued to all the modules, the flow proceeds to step S04. When instructions have been issued to all the modules, the flow proceeds to step S05.

Step S04: An instruction for hash calculation is issued to each of modules to which instructions have not been issued. Then, the flow returns to step S03, where the processing idles until instructions have been issued to all the modules.

Step S05: Hash calculation results transmitted from the modules are awaited. Then, when calculation results are received, it is determined whether calculation results have been received from all the modules. When calculation results have not been received from all the modules, the flow proceeds to step S06. When calculation results have been received from all the modules, the flow proceeds to step S07.

Step S06: The processing idles until calculation results have been received from all the modules. When calculation results have been received from all the modules, the flow returns to step S05.

Step S07: The calculation results, which are per-segment hash values, are arranged in a segment order corresponding to the order of the data on the logical disk. Then, the hash function is applied again to the per-segment hash values that have been arranged in the segment order to calculate a total hash value.

Step S08: The calculation result (total hash value) calculated in step S07 is output, for example, to the part that has requested a hash value, such as the console. The segment size and the hash function are also output if necessary.

Figure 7:
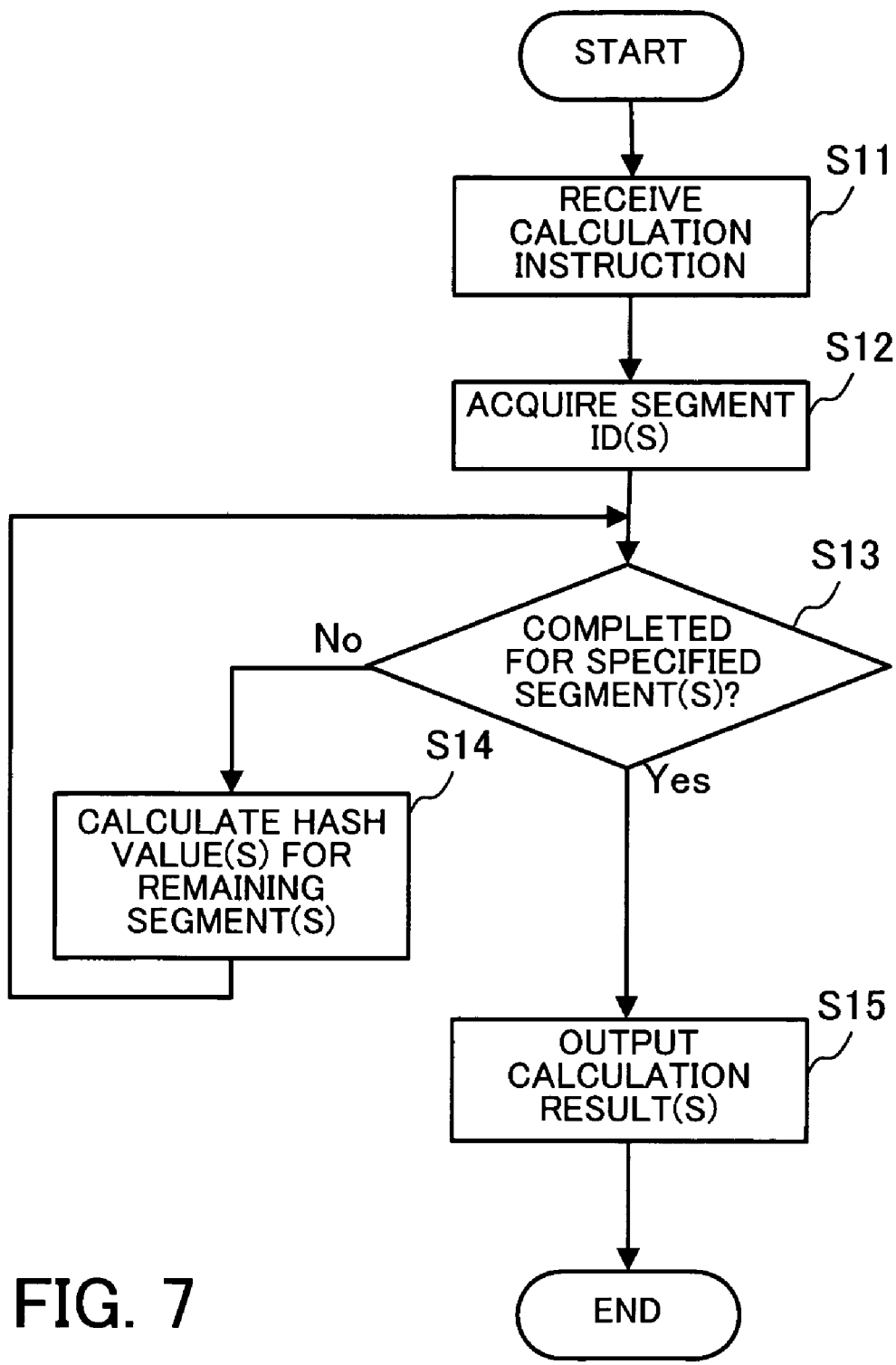
FIG. 7 is a flowchart illustrating a procedure for hash calculation processing in a storage module according to the present embodiment.

A calculation processing procedure performed by each storage module will now be described. FIG. 7 is a flowchart illustrating a procedure for hash calculation processing in a storage module according to the present embodiment.

Step S11: When a calculation instruction with the target segment ID(s) specified is input from the hash calculation control module 501, the processing is started and the flow proceeds to the next step.

Step S12: The segment ID(s) is acquired from the calculation instruction, input in step S11, and subsequent processes are carried out based on the segment ID(s).

Step S13: It is determined whether the storage module has calculated a hash value(s) for the segment(s) specified by the segment ID(s), acquired in step S12. When the hash-value calculation has not been completed, the flow proceeds to step S14. When the hash-value calculation has been completed, the flow proceeds to step S15.

Step S14: Hash calculation is carried out for a segment(s) for which hash value calculation has not been completed to calculate a hash value(s), based on the acquired segment ID(s). Then, the flow returns to step S13.

Step S15: The calculation result(s) is output to the hash calculation control module 501.

When the above-described processing procedure is carried out, a hash value of the target logical disk is calculated. Since calculation is carried out on a module-by-module basis, parallel calculations are realized to reduce the calculation processing time. The calculated hash value is used, for example, to prove that the target logical disk has not been tampered with.

Through the hash calculation performed by the storage management apparatus 110 of the above-described embodiment according to the present invention, it is proved that the data stored in the storage system 100 has not been tampered with. Furthermore, when the hash value calculated in the storage system 100 of the embodiment according to the present invention is publicized together with the applied hash function and the segment size to make them available to any apparatuses, it can be determined whether the data on the logical disk outside the storage system 100 is equivalent to the data stored in the storage system 100.

For example, a host computer that has read out the data on the logical disk can prove that this data matches the data stored in the storage system 100. First, the logical disk is divided by the publicized segment size, and the publicized hash function is applied to each segment to calculate a per-segment hash value. Then, the per-segment hash values are arranged in segment order, and the hash function is applied again to obtain a hash value. When this hash value matches the publicized hash value, it is proved that the target data is the same as the data in storage system 100.

Figure 8:
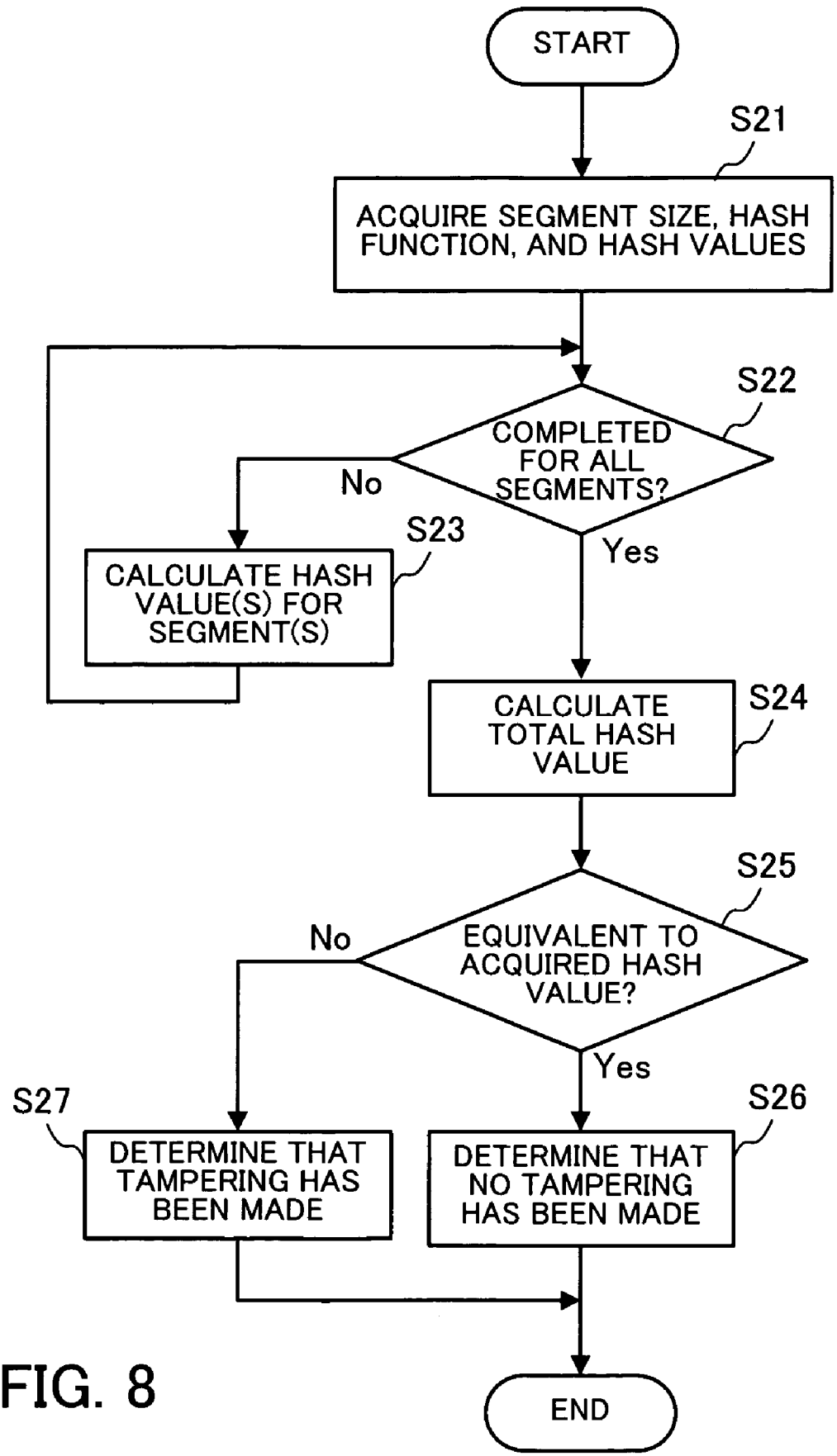
FIG. 8 is a flowchart illustrating a procedure used in a case where the hash calculation processing according to the present embodiment is carried out by another apparatus.
Figure 9:
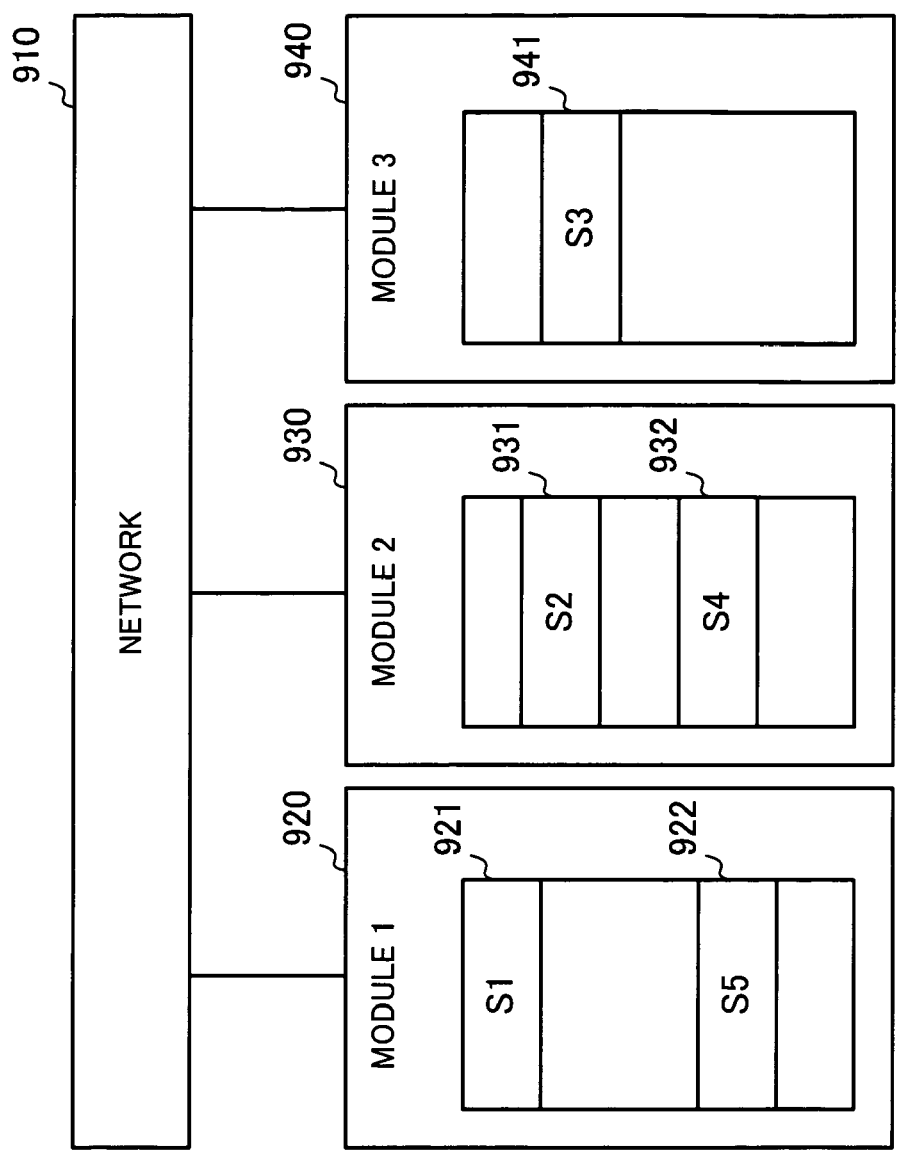
FIG. 9 is an outline diagram depicting one example structure of a known storage system.
Figure 9:
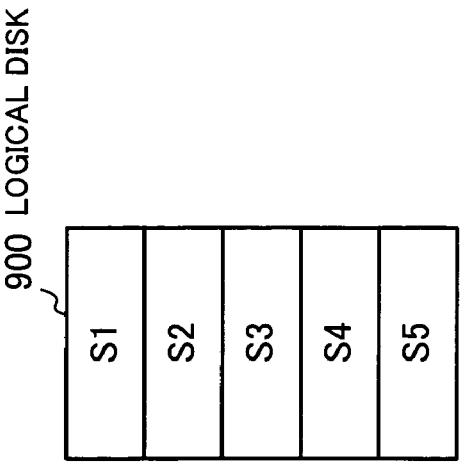

FIG. 8 is a flowchart illustrating a procedure used in a case where hash calculation processing according to the present embodiment is carried out by another apparatus. It is assumed that the other apparatus does not have calculation sections operating in parallel, and the hash value, the segment size, and the hash function are publicized.

Step S21: The publicized segment size, hash function, and hash value are acquired. The target data is divided into segments based on the segment size.

Step S22: It is determined whether hash calculation has been completed for all segments. When hash calculation for at least one segment is not completed, the flow proceeds to step S23. When hash calculation has been completed for all segments, the flow proceeds to step S24.

Step S23: Hash calculation is performed for a segment(s) for which hash calculation has not been completed by applying the hash function acquired in step S21, and the flow proceeds to step S22.

Step S24: Per-segment hash values calculated in step S23 are arranged in a segment order, and the hash function is applied to calculate a total hash value of the target data.

Step S25: The hash value calculated in step S24 is compared with the publicized hash value acquired in step S21 to determine whether the two values match. When the two values match, the flow proceeds to step S26. When the two values do not match, the flow proceeds to step S27.

Step S26: Since the calculated hash value matches the publicized hash value, it is determined that "the target data has not been tampered with," and the processing ends.

Step S27: Since the calculated hash value does not match the publicized hash value, it is determined that "the target data has been tampered with," and the processing ends.

By carrying out the above-described processing procedure, even an apparatus not including a mechanism for parallel calculations of per-segment hash values can calculate and utilize hash values likewise.

The above-described processing functions can be achieved by a computer. For this purpose, a program describing the processing contents of the functions in the hash-value generation apparatus and the storage management apparatus is provided. By executing the program with the computer, the above-described processing functions are achieved on the computer. The program, describing the processing contents, can be recorded in a computer-readable recording medium. Such computer-readable recording media include magnetic recording units, optical disks, magneto-optical recording media, and semiconductor memories. The magnetic recording units include a hard disk unit (HDD), a flexible disk (FD), and a magnetic tape. The optical disks include a DVD, a DVD-RAM, a CD-ROM, a CD-recordable (CD-R), and a CD-rewritable (CD-RW). The magneto-optical recording media include an magneto-optical disk (MO).

To distribute the program, a portable recording medium, such as a DVD or a CD-ROM, having recorded the program thereon is sold, for example. Furthermore, the program can be stored in a storage device of a server computer so that the program is transferred from the server computer to another computer via a network.

The computer, which executes the program, stores in a storage device thereof, the program recorded in a portable recording medium or the program transferred from the server computer, for example. Then, the computer reads out the program from the storage device thereof and carries out processing according to the program. The computer can read out the program directly from the portable recording medium and then carry out the processing according to the program. Furthermore, the computer can carry out the processing according to the program each time the program is transferred from the server computer.

According to the present invention, a target disk is divided into segments of fixed length; a one-way hash function is applied to all data in the segments to calculate per-segment hash values; the per-segment hash values are arranged according to the order of data on the target disk; and the one-way hash function is applied again to calculate a total hash value. For example, by carrying out calculation of per-segment hash values with concurrently operable hash-value calculation blocks, the time required for hash value calculation is reduced. In particular, even though the data size on the target disk increases, the total processing speed is not decreased due to parallel calculations.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium having recorded a hash-value generation program for generating a hash value of data stored on a target disk by the use of a one-way hash function, the program, when executed by a computer, causes the computer to perform a method, the method comprising:

dividing the target disk into fixed-length segments;

calculating per-segment hash values by applying the one-way hash function to data in every segment generated by the dividing;

arranging the per-segment hash values in a same order as the segments are arranged;

calculating a total hash value by applying the one-way hash function to the arranged per-segment hash values;

saving the calculated total hash value calculated at a specified time;

repeating the calculation of the per-segment hash values and the calculation of the total hash value to obtain a recalculated total hash value at a later time; and comparing the calculated total hash value with the recalculated total hash value to verify the calculated total hash value and the recalculated total hash value match.

2. The computer-readable recording medium having recorded a hash-value generation program according to claim 1, the method further comprising:

assigning the generated segments to a plurality of concurrently operable hash-value calculation blocks and the hash-value calculation blocks calculate the per-segment hash values of all data strings in the assigned segments.

3. A computer-readable recording medium having recorded a storage management program for managing a storage system in which data on a virtual logical disk is stored in units of segments in a distribution manner in a plurality of storage modules, the program, when executed by a computer, causes the computer to perform a method, the method comprising:

controlling first hash-value calculation blocks included in each of the plurality of storage modules to calculate per-segment hash values by applying a one-way hash function to data in every segment, the segments having a fixed length;

acquiring the per-segment hash values calculated by the first hash-value calculation blocks of the storage modules;

arranging the per-segment hash values in a segment order corresponding to the order of the data on the logical disk;

calculating a total hash value of the logical disk by applying the one-way hash function to the arranged per-segment hash values;

saving the calculated total hash value calculated at a specified time;

repeating the calculation of the per-segment hash values and the calculation of the total hash value to obtain a recalculated total hash value at a later time; and comparing the calculated total hash value with the recalculated total hash value to verify the calculated total hash value and the recalculated total hash value match.

4. The computer-readable recording medium having recorded a storage management program according to claim 3, the method further comprising:

searching for the segments assigned to the storage modules based on a data definition described as meta-information of the logical disk; and instructing the first hash-value calculation blocks to carry out hash calculations for the found segments.

5. The computer-readable recording medium having recorded a storage management program according to claim 3, wherein the controlling includes issuing a calculation instruction to the first hash-value calculation blocks of the storage modules to cause the first hash-value calculation blocks of the plurality of storage modules to operate in parallel.

6. The computer-readable recording medium having recorded a storage management program according to claim 3, the method further comprising:

permitting an external apparatus connected via a network to refer to at least one of the calculated total hash value, the length of the segments, and the one-way hash function.

7. The computer-readable recording medium having recorded a storage management program according to claim 3, the method further comprising:

receiving a request from an external apparatus connected via a network, the request relating to the logical disk;

the controlling controls the first hash-value calculation blocks of the storage modules corresponding to the requested logical disk;

the calculating calculates the total hash value of the requested logical disk; and transmitting the calculated total hash value of the logical disk to the external apparatus.

8. The computer-readable recording medium having recorded a storage management program according to claim 3, wherein the saving, repeating and comparing are sequentially performed at time intervals or upon a request from an external apparatus connected via a network.

9. A storage system for storing data on a virtual logical disk in a storage to manage the data, the storage system comprising:

a plurality of storage modules each including:
    storage to divide the logical disk into fixed-length segments and to store the data therein; and
    first hash-value calculation blocks to, upon receiving a calculation instruction, calculate per-segment hash values by applying a one-way hash function to data in every segment stored in the storage; and a storage management module including:
    a controller to, upon request for a hash value of the logical disk, control calculation processing of the per-segment hash values performed by the first hash-value calculation blocks included in each of the storage modules; and
    second hash-value calculation block to calculate a total hash value for the logical disk by arranging the per-segment hash values in a segment order corresponding to the order of the data on the logical disk, and by applying the one-way hash function to the arranged per-segment hash; and
a verification block to save the calculated total hash value at a specified time and to compare the saved total hash value with a total hash value recalculated at a later time to verify the saved calculated total hash value and the recalculated total hash value match.

10. The storage system according to claim 9, wherein the storage management module outputs a calculation instruction to the plurality of storage modules to cause the storage modules to operate in parallel.

11. The computer-readable recording medium having recorded a hash-value generation program according to claim 1 wherein the saving also saves at least one of the size of the segments and the one-way hash function, and the repeating uses the at least one of the size of the segments and the one-way hash function.

12. The computer-readable recording medium having recorded a storage management program according to claim 3, wherein the saving also saves at least one of the size of the segments and the one-way hash function, and the repeating uses the at least one of the size of the segments and the one-way hash function.

* * * * *